United States Patent [19]

Castelaz et al.

[11] Patent Number: 5,003,490
[45] Date of Patent: Mar. 26, 1991

[54] NEURAL NETWORK SIGNAL PROCESSOR

[75] Inventors: Patrick F. Castelaz, Yorba Linda; Dwight E. Mills, La Verne, both of Calif.

[73] Assignee: Hughes Aircraft Company, Los Angeles, Calif.

[21] Appl. No.: 255,090

[22] Filed: Oct. 7, 1988

[51] Int. Cl.$^5$ .............................................. G06G 7/60
[52] U.S. Cl. ...................................... 364/513; 382/15
[58] Field of Search .................... 364/513; 382/14, 15

[56] References Cited

U.S. PATENT DOCUMENTS

| | | | |
|---|---|---|---|
| 3,950,733 | 4/1976 | Cooper et al. | 340/172.5 |
| 4,254,474 | 3/1981 | Cooper et al. | 364/900 |
| 4,326,259 | 4/1982 | Cooper et al. | 364/715 |
| 4,450,530 | 5/1984 | Llinas et al. | 364/513 |
| 4,591,980 | 5/1986 | Huberman et al. | 364/200 |

OTHER PUBLICATIONS

Lippman, Richard P.–"An Introduction to Computing with Neural Nets", IEEE ASSP Mag. 4/87.

Primary Examiner—Salvatore Cangialosi
Attorney, Agent, or Firm—Wanda K. Denson-Low

[57] ABSTRACT

A neural network signal processor (NSP) (20) that can accept, as input, unprocessed signals (32), such as those directly from a sensor. Consecutive portions of the input waveform are directed simultaneously to input processing units, or "neurons" (22). Each portion of the input waveform (32) advances through the input neurons (22) until each neuron receives the entire waveform (32). During a training procedure, the NSP 20 receives a training waveform (30) and connective weights, or "synapses" (28) between the neurons are adjusted until a desired output is produced. The NSP (20) is trained to produce a single response while each portion of the input waveform is received by the input neurons (22). Once trained, when an unknown waveform (32) is received by the NSP (20), it will respond with the desired output when the unknown waveform (32) contains some form of the training waveform (30).

27 Claims, 4 Drawing Sheets

NEURAL NETWORK SIGNAL PROCESSOR

BACKGROUND OF THE INVENTION

1. Technical Field

This invention relates to feature extraction and pattern recognition devices, and in particular, to a neural network signal processor that can internally develop, or "learn" the algorithms required for identification of features directly from input sensor signals.

2. Discussion

The ability to recognize patterns is a major step towards the development of artificial systems that are capable of performing perceptual tasks that currently only biological systems can perform. Speech and visual pattern recognition are two areas in which conventional computers are seriously deficient. In an effort to develop artificial systems that can perform these and other tasks, a number of signal processing techniques have been developed to extract features from signals. These techniques typically involve extensive preprocessing. Such preprocessing may require, for example, measuring pulse width, amplitude, rise and fall times, frequency, etc. Once these features are extracted they can be matched with stored patterns for classification and identification of the signal. The software required to accomplish these steps is often complex and is time consuming to develop. Moreover, conventional digital signal processors are not able to tolerate certain variations in the input signal, such as changes in orientation of a visual pattern, or differences in speakers, in the case of speech recognition.

In recent years it has been realized that conventional Von Neumann computers, which operate serially, bear little resemblance to the parallel processing that takes place in biological systems such as the brain. It is not surprising, therefore, that conventional signal processing techniques should fail to adequately perform the tasks involved in human perception. Consequently, new methods based on neural models of the brain are being developed to perform perceptual tasks. These systems are known variously as neural networks, neuromorphic systems, learning machines, parallel distributed processors, self-organizing systems, or adaptive logic systems. Whatever the name, these models utilize numerous nonlinear computational elements operating in parallel and arranged in patterns reminiscent of biological neural networks. Each computational element or "neuron" is connected via weights or "synapses" that typically are adapted during training to improve performance. Thus, these systems exhibit self-learning by changing their synaptic weights until the correct output is achieved in response to a particular input. Once trained, neural nets are capable of recognizing a target and producing a desired output even where the input is incomplete or hidden in background noise. Also, neural nets exhibit greater robustness, or fault tolerance, than Von Neumann sequential computers because there are many more processing nodes, each with primarily local connections. Damage to a few nodes or links need not impair overall performance significantly.

There is a wide variety of neural net models utilizing various topologies, neuron characteristics, and training or learning rules. Learning rules specify an internal set of weights and indicate how weights should be adapted during use, or training, to improve performance. By way of illustration, some of these neural net models include the Perceptron, described in U.S. Pat. No. 3,287,649 issued to F. Rosenblatt; the Hopfield Net, described in U.S. Pat. Nos. 4,660,166 and 4,719,591 issued to J. Hopfield; the Hamming Net and Kohonen self-organizing maps, described in R. Lippman, "An Introduction to Computing with Neural Nets", IEEE ASSP Magazine, April 1987, pages 4–22; and the Generalized Delta Rule for Multilayered Perceptrons, described in Rumelhart, Hinton, and Williams, "Learning Internal Representations by Error Propagation", in D. E. Rumelhart and J. L. McClelland (Eds.), Parallel Distributed Processing; Explorations in the Microstructure of Cognition. Vol. 1: Foundations. MIT Press (1986).

While each of these models achieves varying degrees of success at the particular perceptual tasks to which it is are best suited, the parallel inputs required by these systems are thought to necessitate special purpose preprocessors for real time hardware implementations. (See the above-mentioned article by R. Lippman.) For example, in Rosenblatt's Perceptron, (U.S. Pat. No. 3,287,649) each input receives a separate frequency band of an analog audio signal. More recent physiologically based preprocessor algorithms for speech recognition attempt to provide information similar to that available on the auditory nerve. Thus, while neural nets offer the distinct advantage of self-learning and elimination of software, a certain amount of preprocessing has still been required in prior neural nets. While prior neural nets may require less preprocessing than digital signal processors, they still share this disadvantage with conventional digital signal processors. Accordingly, it would be desirable to provide a neural network capable of real time signal processing that eliminates, or significantly reduces the preprocessing required.

SUMMARY OF THE INVENTION

Pursuant to the present invention, a neural network signal processor (NSP) is provided which does not require preprocessors but instead, can receive and analyze raw sensor signal data. This data may comprise one dimensional or multi-dimensional optical, audio or other types of data. The NSP is a feature extraction and pattern recognition device that can accept raw sensor signals as input and identify targets signatures by using features in algorithms it has previously learned by example.

In accordance with the present invention, the NSP comprises a layer of input processing units, or "neurons", connected to other layers of similar neurons. The neurons are interconnected through weighted connections, or "synapses", in accordance with the particular neural network model employed. The neurons in the input layer are connected to a sensor or other signal producing means to receive the signal to be analyzed. This signal may contain a target signal that is to be identified, or it may contain a target signal that has been obscured in the raw signal, for example, due to extraneous signals, an incomplete target signal, or alterations in the target signal.

In order to "train" the neural net to "recognize", or respond with the correct output in response to a target input, a target, or training input is repeatedly fed into the NSP and the net adapts the interconnections between the neurons until it responds in the desired manner. The particular training algorithm used will be one appropriate for the particular neural net model employed. The desired output may be, for example, a binary response where certain output neurons respond when the target signal is present and do not respond when it is absent. It should be noted that the NSP can be trained to respond to more than one target signal. Since the "knowledge" in the NSP is in the connections, if there are sufficient interconnections, in a given training session, the net may be trained with a number of different target classes. Once trained, the net will respond with the correct output when an input signal containing the target is fed to it, even where the input contains noise or is otherwise obscured.

In accordance with the present invention, during training and during identification of an unknown signal, the input signal is fed directly to the input neurons of the NSP. This may be accomplished by moving the input signal across the input neurons in a stepwise fashion. A circuit which employs a storage means, such as a sample and hold circuit, is used to "stop" the signal for each discrete step. Rather than employing a training scheme in which a single or static set of inputs are used to train the net to produce a single output, in the present invention, the net is trained to produce a single output state in response to a changing input comprising successive portions of the input waveform. Thus, a kind of dynamic learning is employed, since a changing set of inputs teaches the net to produce a single output response.

In the preferred embodiment, the training procedure is as follows. Initially, the system is at rest and the weights between the neurons are set to various small preferably random values. Next, the initial portion of the input signal is fed to the first input neuron. Input neurons produce a response that is some function of the input signal. This response is directed to the neurons in successive layers through weighted connections. The signal is propagated through the NSP until an output is produced by the neurons in the output layer. In the "typical" neural net model, the learning algorithm will attempt to minimize the difference between the actual and the desired output by effecting a change in the synaptic weights between the neurons.

Next, the input signal will be advanced one step through the sampling circuit, so that the first output neuron will receive a second portion of the input signal. The signal is again propagated through the net, a new output is produced, and the weights are again adjusted to reduce the difference between the actual and correct output. In this way, the weights are adjusted after each step of the input signal across the input neurons.

At some point after entering the first input neuron, the input signal will progress to the second and successive input neurons. Thus, after a certain number of steps, the first part of the input signal will be fed to the second input neuron and a later portion will be fed to the first input neuron. At this stage, the signals introduced into the first and second input neurons are processed through the net simultaneously. Depending on the length of the input signal and the number of input neurons in the input layer, at a later stage a different consecutive portion of the input signal may be fed to each of the input neurons simultaneously, whereupon each portion of the signal will be processed through the net at the same time. Once the entire signal has moved through each input neuron in a stepwise manner, the first training cycle is complete. It should be noted that many training cycles are normally needed before the NSP is adequately trained to produce the correct response. Additional training cycles may then be employed for other target signals that are desired to be classified by the NSP. In this way, the NSP will be trained to produce a different response for each different target signal. The number of training cycles required will depend on a number of factors including the type of neural net model, the number of neurons, the complexity of the target signal, etc.

Once all training is complete, an unknown signal of a particular length may be fed to the NSP. The input mechanism may be identical to that employed during training. That is, the signal passes through each neuron in the input layer in a series of discrete steps until the entire input signal passes through each input neuron. However, weights are normally only changed during the training cycles. Alternatively, it may be possible to feed the unknown signal continuously, omitting the discrete steps used during training.

If the unknown signal contains some form of the target signal, the net will respond with the particular output that corresponded to that target during training. The neural net will respond even if noise is present or there is an alternation from the pure target signal. The NSP thus employs a structure that is independent of any explicit signal processing algorithms. It requires no preprocessing, no software, is inherently fault tolerant, and its regular architecture results in a high speed, low complexity, relatively low cost implementation.

BRIEF DESCRIPTION OF THE DRAWINGS

The various advantages of the present invention will become apparent to one skilled in the art by reading the following specifications and by reference to the following drawings in which.

DESCRIPTION OF THE PREFERRED EMBODIMENT

Figure 1:
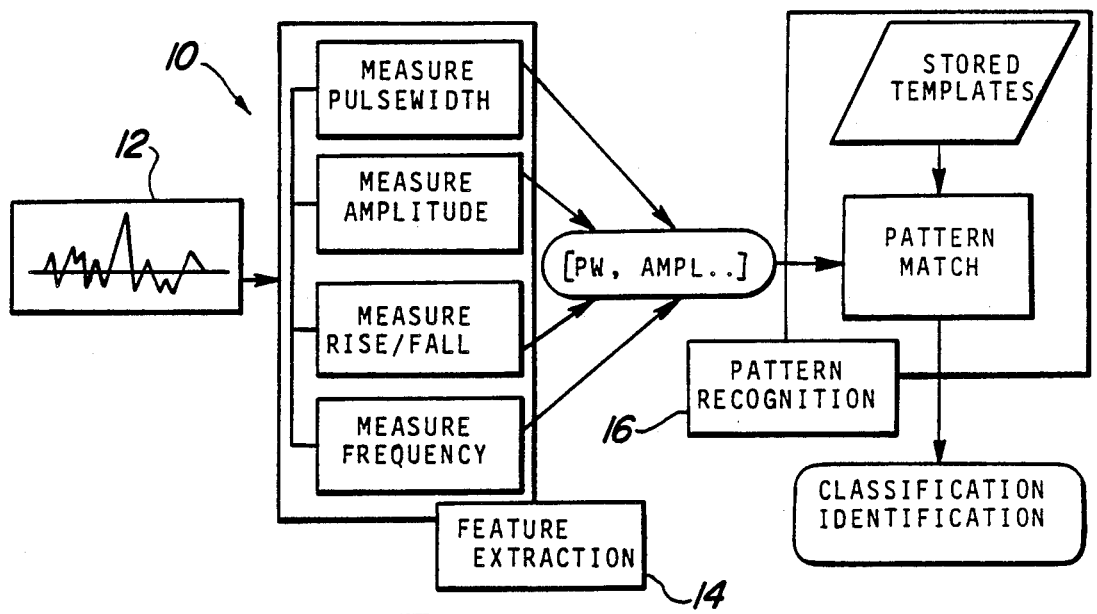
FIG. 1 is a block diagram of a conventional digital signal processor.

Referring to FIG. 1, a block diagram of a conventional signal processor 10 is shown. A raw analog signal 12, which may comprise the output of a sensor or other signal producing device, is fed to the signal processor 10. A number of operations then are performed to extract certain features from the signal 12 in a feature extraction stage 14. These steps may involve a measurement of the pulse width, the amplitude, rise and fall time, frequency, etc. The results of the feature extraction process are then analyzed in a pattern recognition stage 16, where stored features are compared to the extracted features and the signal processor 10 searches for a match. If a match is found the processor 10 responds with the correct classification.

Figure 2:
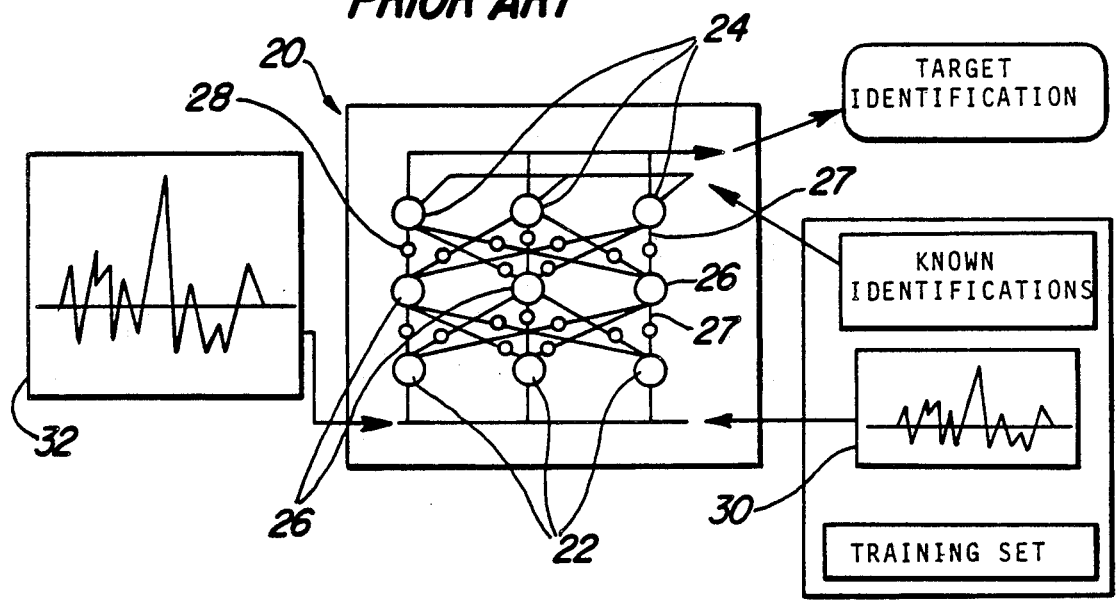
FIG. 2 is a block diagram of the neural net signal processor in accordance with the teachings of the present invention.

Such conventional signal processors have a number of drawbacks. These include the requirements that the problem be well understood and that explicit and complex algorithms must be developed. Also, the hardware needed to accomplish conventional signal processing is costly and complex, especially for real time processing. The present invention provides a neural net signal processor (NSP) which requires no software, because the algorithms are developed by the processor itself through training. A block diagram of the preferred embodiment of the NSP 20 is shown in FIG. 2. The NSP 20 comprises a plurality of rows of individual processors or "neurons" arranged in a configuration of the general class known as a Multilayer Perceptron. In a Multilayer Perceptron the neurons are arranged in three or more layers. Each neuron produces a output which is some predetermined function of its input. The first, or input, layer comprises neurons that are called the input neurons 22, and the neurons in the last layer are called output neurons 24. The neurons 22, 24 may be constructed from a variety of conventional digital or analog devices. For example, op amps may be used for the neurons 22, 24. One or more inner layers comprise neurons that are called hidden neurons 26. While only three neurons are shown in each layer in FIG. 2, it will be understood that any number of neurons may be employed depending on the particular problem to be solved. Each neuron in each layer is connected to each neuron in each adjacent layer. That is, each input neuron 22 is connected to each hidden neuron 26 in the adjacent inner layer. Likewise, each inner neuron 26 is connected to each neuron in the next adjacent layer. This next layer may comprise additional inner neurons 26, or, as shown in FIG. 2, the next layer may comprise the output neurons 24. It should be noted that in a Perceptron, neurons are not connected to other neurons in the same layer.

Each of the connections 27 between the neurons contain weights or "synapses" 28 (only some of the connections 27 and synapses 28 are labeled in FIG. 2 to avoid confusion; however, numerals 27 and 28 are meant to include all connections 27 and synapses 28 shown). These synapses 28 may be implemented with variable resistances, or with amplifiers with variable gains, or with FET connection control devices utilizing capacitors. The synapses 28 serve to reduce or increase the strength of the connection between the neurons. While the connections 27 are shown with single lines, it will be understood that two individual lines may be employed to provide signal transmission in two directions, since this will be required during the training procedure. The value of the connection strength of each synapse 28 may vary from some predetermined maximum value to zero. When the weight is zero there is in effect, no connection between the two neurons.

The process of training the NSP 20 to recognize a particular signal involves adjusting the connection strengths of each synapse 28 in a repetitive fashion until the desired output is produced in response to a particular input. More specifically, during training a raw signal containing a known waveform, or target 30, is fed to the input layer neurons 22. The particular input mechanism, in accordance with the present invention, will be described in more detail below. This target signal 30 is fed to each neuron 22 in the input layer and a particular output is produced which is a function of the processing by each neuron and the weighting value of each synapse 28. The output of the output neurons 24 is compared with a desired output and the difference between the actual and desired output is computed. Based on this difference, an error signal is then produced which is used to adjust the weights in each synapse 28 in a way that reduces the value of the output error.

The above training procedure is repeated until the error signal is reduced to an acceptable level, and the NSP 20 produces the desired output in response to the target input 30. Once trained, a raw signal to be identified or classified 32 is fed to the input neurons 22 in a way similar to the manner in which the training signal 30 was introduced. The signal to be identified 32 may or may not contain the target signal 30 or it may contain a degraded or a noisy version of the target signal 30. If the target is present in some form, the NSP 20 will respond with the output that corresponded to that target signal 30 during training. If the target signal is not present, a different response or no response will be produced.

The NSP 20 may be trained to recognize more than one target 30. The number of targets the NSP 20 is capable of recognizing will depend on various factors such as the number of neurons, the number of layers and the complexity of the target signal. The NSP 20 can recognize multiple targets because, as the NSP 20 is trained with successive targets, the effective "path" of each target through the neurons will differ due to the different weights connecting neurons. However, there is a limit to the number of targets because as more targets are introduced, the subsequent training procedures will alter weights from previous training to partially erase or degrade the NSP's 20 ability to recognize the earlier target.

Figure 3:
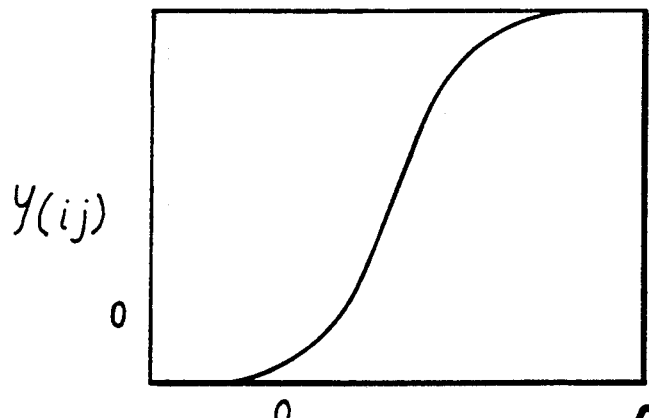
FIG. 3 is a graph of a typical sigmoid activation function in accordance with the teachings of the present invention.
Figure 4:
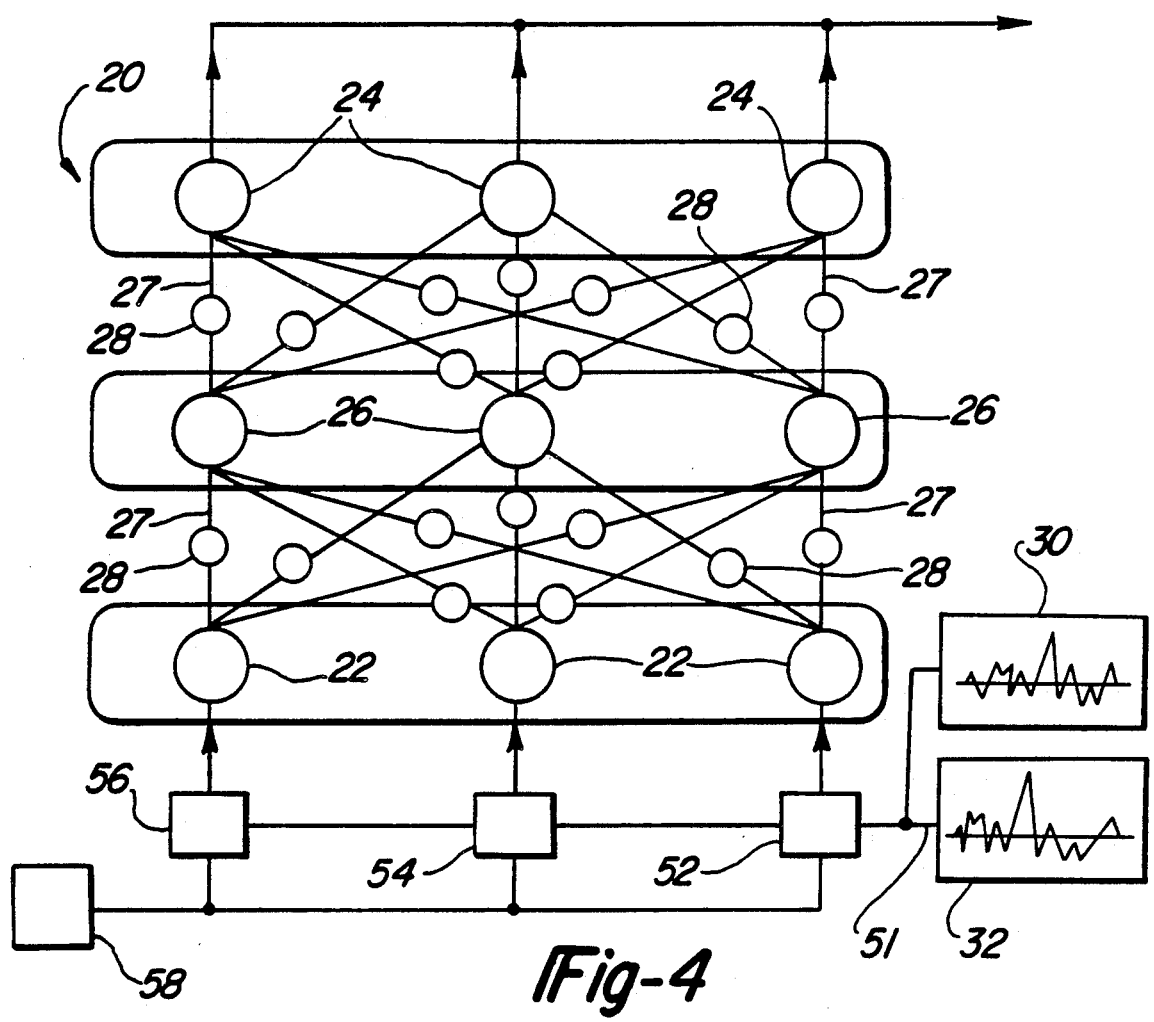
FIG. 4 is a diagram of a three layer neural network having three neurons per layer in accordance with the teachings of the present invention.

Referring now to FIG. 4, the operation of the NSP 20, in accordance with the present invention, will be discussed in more detail. The input 22, hidden 26, and output 24 neurons each comprise similar processing units which have one or more inputs and produce a single output signal. In accordance with the preferred embodiment, a modified version of the Back Propagation training algorithm described in the above-mentioned article by Rumelhart is employed. This algorithm requires that each neuron produce an output that is a continuous differentiable nonlinear or semilinear function of its input. It is preferred that this function, called an activation function, be a sigmoid logistic nonlinearity of the general form $$y_{(i,j)} = \frac{1}{1 + e^{-(\sum_i w_{ji} y_{(ij)} + \theta_j)}} \quad (1)$$

Where $y_{(ij)}$ is the output of neuron j in layer i, $w_{ji} y_{(ij)}$ is the sum of the inputs to neuron j from the previous layer, $y_{(i,j)}$ is the output of each neuron in the previous layer, $w_{ij}$ is the weight associated with each synapse connecting the neurons in the previous layer to neuron j, and $\theta_j$ is a bias similar in function to a threshold. The general shape of this sigmoid function y(ij) is shown in FIG. 3. The derivative of this function $y_{(ij)}$ with respect to its total input, net $_{ij} = \sum w_{ij} y(ij) + \theta_j$ is given by $$\frac{\partial y_{(ij)}}{\partial net_{ij}} = y_{(ij)}(1 - y_{(ij)}). \quad (2)$$

Thus, the requirement that the activation function be differentiable is met.

During training, the activation function $y_{(ij)}$ remains the same for each neuron but the weights of each synapse 28 are modified. Thus, the patterns of connectivity are modified as a function of experience. The weights on each synapse 28 are modified according to $$\Delta w_{ij} = \eta \delta_{(ik)} y_{(ij)} \quad (3)$$

where $\delta(ik)$ is an error signal available to the neuron receiving input along that line, y(ij) is the output of the unit sending activation along that line, and $\eta$ is a constant of proportionality also called the learning rate.

The determination of the error signal is a recursive process that starts with the output units. First, a target signal 30 is transmitted to the input neurons 22. This will cause a signal to be propagated through the NSP 20 until an output signal is produced. This output is then compared with the output that is desired. For example, a binary output may be desired where, in response to a particular target signal 30, certain ones of the output neurons 24 are "on" and the others are "off". It should be noted that the activation function $y_{(ij)}$ cannot reach the extreme values of one or zero without infinitely large weights, so that as a practical matter where the desired outputs are zero or one, values of 0.1 and 0.9 can be used as target values. The actual output produced by each output neuron 24 is compared with the desired output and the error signal is calculated from this difference. For output units $$\delta_{ij} = (t_{ij} - y_{ij}) \frac{(\partial y_{ij})}{(\partial net_{ij})} \quad (4)$$

From equation (2) then $$\delta_{ij} = (t_{ij} - y_{ij})(y_{ij})(1 - y_{(ij)}) \quad (5)$$

For hidden neurons 26 there is no specified target so the error signal is determined recursively in terms of the error signals in the neurons to which it directly connects and the weights of those connections. Thus, for non-output neurons $$\delta_{ij} = y(ij)(1 - y_{ij}) \Sigma_k \delta_{ik} w_{(jk)} \quad (6)$$

From equation 3 it can be seen that the learning rate $\eta$ will effect how much the weights are changed each time the error signal $\delta$ is propagated. The larger $\eta$, the larger the changes in the weights and the faster the learning rate. If, however, the learning rate is made too large the system can oscillate. Oscillation can be avoided even with large learning rates by using a momentum term $\alpha$. Thus, $$\Delta w_{(i,j,k+1)} = \eta \delta y_{(ij)}(ij) + \alpha \Delta w_{(i,j,k)} \quad (7)$$

The constant $\alpha$ determines the effect of past weight changes on the current direction of movement in weight space, providing a kind of momentum in weight space that effectively filters out high frequency variations in the weight space.

Figure 5:
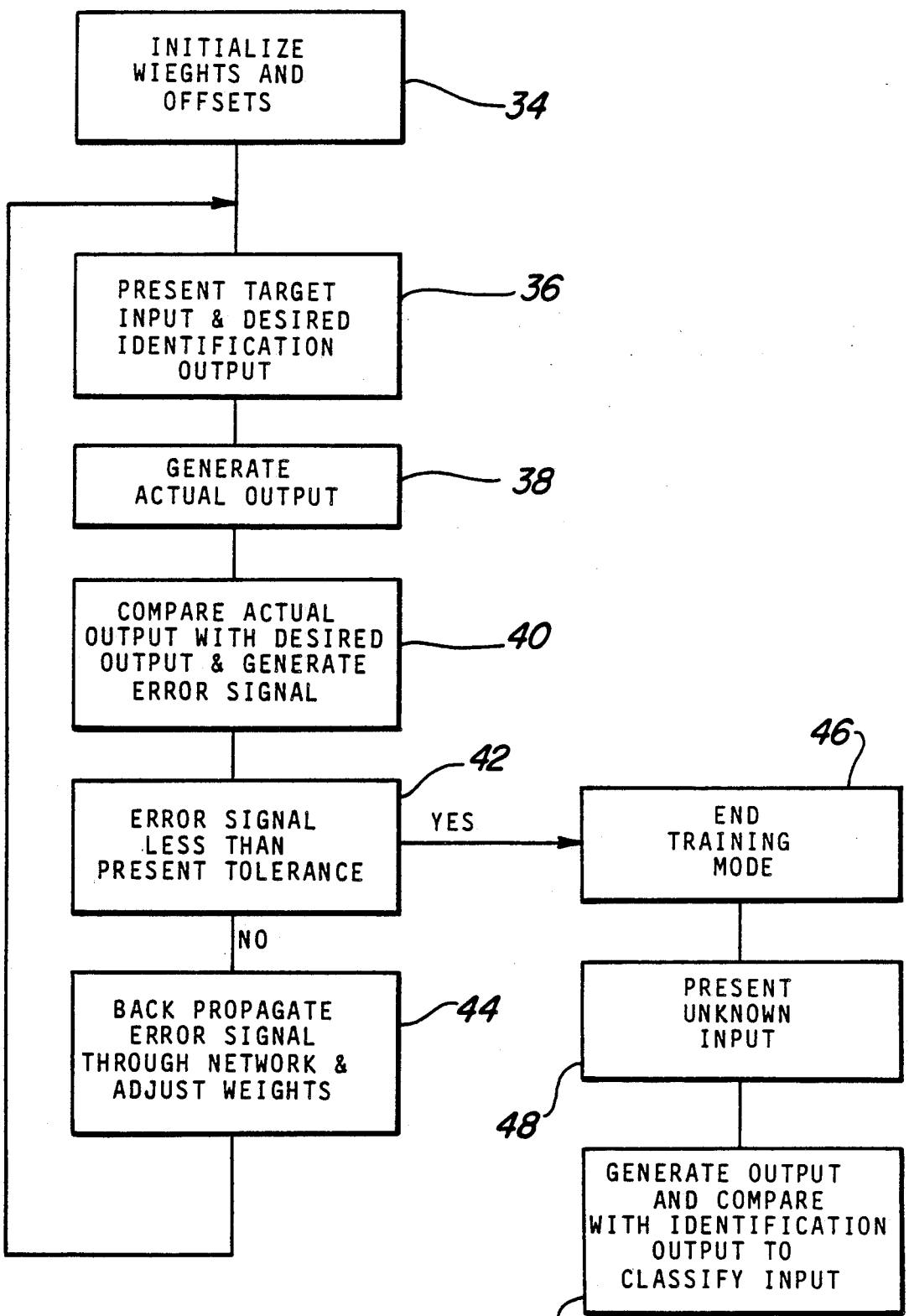
FIG. 5 is a flowchart showing the steps of the backward error propagation technique for training in accordance with the present invention.
Figure 6:
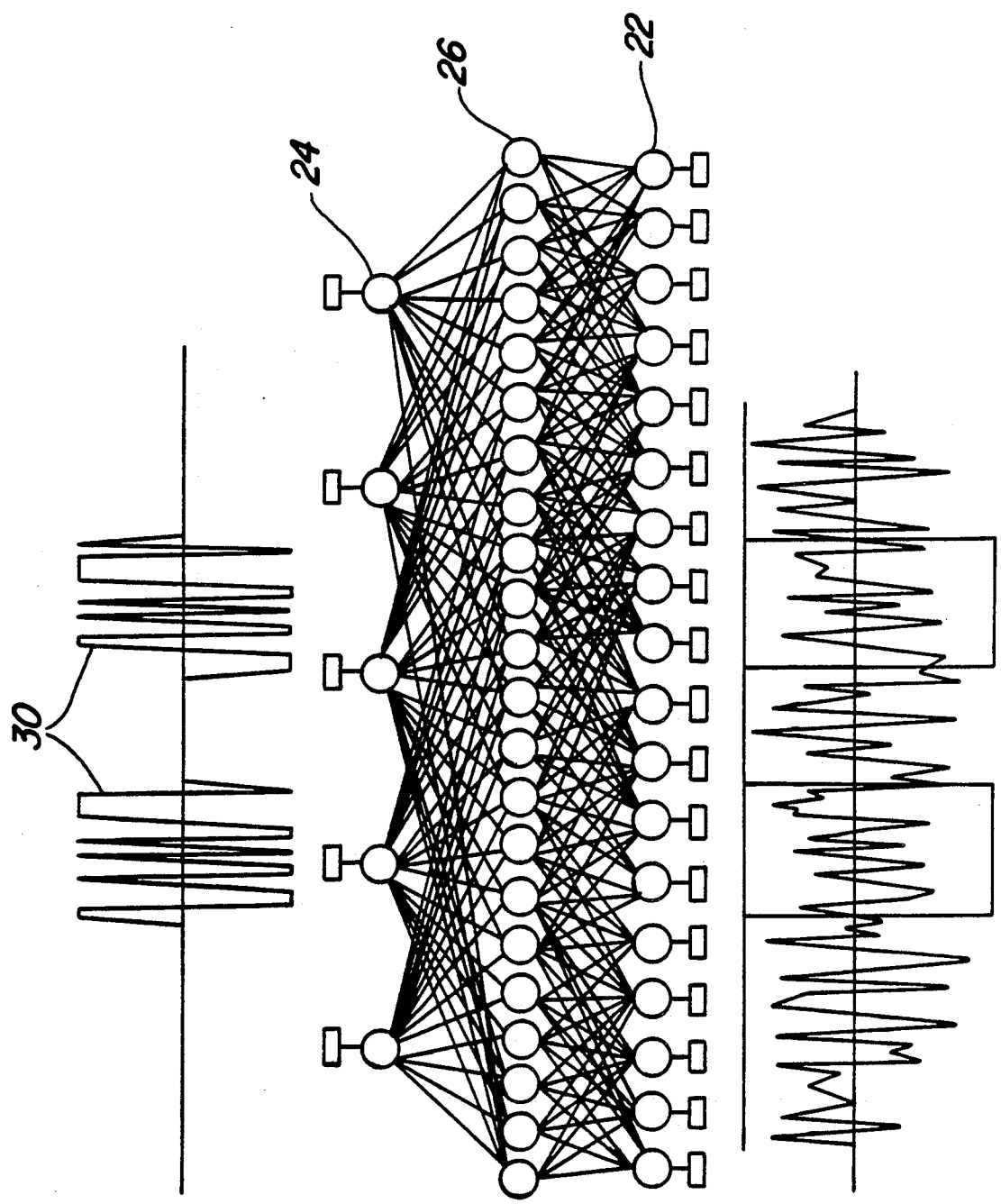
FIG. 6 shows the results of a computer simulation of the neural network signal processor indicating the identification of two target signals.

A summary of the back propagation training algorithm is shown in FIG. 5. First, the weight w and neuron offsets are set to small random values. (Step 34). A portion of the target input signal 30 is then presented to the input neuron and the desired output is specified. (Step 36). After the input signal 30 is propagated through each layer of neurons an output value is eventually calculated for each output neuron 24 based on the sigmoid activation function $y_{(ij)}$ described in equation (1). Next, the actual output is generated (Step 38) and compared to the desired output for each output neuron 24, and the error signal $\delta$ in equation (5) is computed (Step 40). The error signal is then compared to a preset tolerance (Step 42). If the error is larger than the tolerance, the error signal makes a backward pass through the network and each weight is changed by an amount $\Delta w$ as defined by equation (7). (Step 44). The target signal 30 is again presented and the weights adjusted again (Steps 36–44) repeatedly until the error is reduced to an acceptable level. When the error signal is smaller than the preset tolerance (Step 42), the training procedure for that target signal 30 is complete. (Step 46). The NSP 20 can then be retrained with a new target signal. Once training for all the target signals is complete, an unknown signal 32 is then presented to the input neurons 22. (Step 48). After the signal is propagated through the network, the output neurons will produce an output signal. If the target signal is present in the input, the NSP 20 will produce the desired response to correctly identify the target signal. (Step 50).

In accordance with the present invention, the particular input mechanism of input signals into input neurons 22 will now be described. Referring the FIG. 4, an input signal, which may comprise the target input 30 or an unknown signal 32 to be classified, is directed to an input line 51. The input signal is an analog signal which may originate from a variety of sources. For example, the input signal may comprise one dimensional information derived from one of a number of signal producing sensors such as infrared, radar, sonar, and speech sensors. Or, the signal may comprise two dimensional data for solving such problems as object detection and identification in surveillance, reconnaissance, etc.

In some cases this input signal will comprise a raw signal directly from a sensor, in other cases it may be desirable to perform some type of preprocessing, such as the use of doppler data derived from sensors.

In any event, the input data signal is transmitted to the first of a series of sampling circuits 52, 54, 56. It will be appreciated that various types of sampling circuits, such as sample and hold circuits, can be constructed to accomplish the desired function. The purpose of these sampling circuits is to present the input neurons 22 with a window of sampled signal data that contains as many samples as there are input neurons 22. Initially, a sample of the leading edge of the input signal is entered into the first sampling circuit 52. This input signal is propagated through the NSP 20 until an output is produced by the output neurons 24. In the next step, the next portion of the input signal is sampled by the first sampling circuit 52, and the portion that was received by sample circuit 52 in the previous step is passed to the next sampling circuit 54. Thus, two signals originating from both sampling circuits 52 and 54 are propagated simultaneously through the NSP 20. The sampling circuits are synchronized by pulses from a clock circuit 58. Later, all of the input neurons 22 are simultaneously receiving different portions of the input signal and the NSP 20 produces a single output state for each step. Eventually, the entire input signal propagates in a stepwise fashion from right to left through the NSP 20 in FIG. 4. In the training mode, the training algorithm will adjust the weights after each step until the output is brought to a particular desired state. When not in the training mode, the NSP 20 will not adjust the weights but will produce an output state that corresponds to the input signal 32. Since no adjustment in weights is necessary for analyzing an unknown signal 32, the signal may alternatively be input using smaller steps, or even in a continuous manner by the sampling circuits 52, 54, and 56.

A number of variables such as the signal width and amplitude, the width of each sampled step, and the number of input 22, hidden 26 and output 24 neurons will vary with the particular type of signal to be analyzed. The results of a software simulation of the NSP 20, is illustrated graphically in FIG. 5, demonstrating the identification of two target patterns by a three layer neural network signal processor 20.

It should be noted that beyond solving one and two dimensional problems as mentioned above, the NSP 20 is adaptable to multi-dimensional problems such as pre-detection data fusion, natural language processing, real time synthetic expert (not requiring an expert) systems, multi-dimensional optimization classes of problems, and other classical pattern recognition problems. It will be appreciated that the basic components of the NSP 20 may be implemented with conventional analog or digital electrical circuits, as well as with analog VLSI circuitry. Also, optical devices may be used for some or all of the functions of the NSP 20. An optical embodiment has been made feasible due to recent advances in such areas as holographic storage, phase conjugate optics, and wavefront modulation and mixing. In addition, once the NSP 20 has been trained to recognize a particular waveform, an NSP could then be reproduced an unlimited number of times by making an exact copy of the trained NSP 20 having the same but fixed synaptic weight values as the trained NSP 20. In this way, mass production of NSP's 20 is possible without repeating the training process.

From the foregoing description it can be appreciated that the present invention provides a high speed neural network signal processor 20 that is capable of self-learning and can be implemented with noncomplex, low cost components and without software. It isn't as susceptible to damage as conventional signal processors and can perform target identification in a robust manner. Once trained, the NSP 20 can be subsequently re-trainable for whole new classes of targets. Those skilled in the art can appreciate that other advantages can be obtained from the use of this invention and that modifications can be made without departing from the true spirit of the invention after studying the specification, drawings and following claims.

What is claimed is:

1. In a neural network having a plurality of neurons adapted to receive signals and adapted to present an output, a plurality of connective synapses providing a weighted coupling between said neurons, said neural network being capable of adapting itself to produce a predetermined output in response to an input by changing the value of said weights, the improvement comprising:
   a plurality of input neurons adapted to receive external input signals;
   means for directing selected, consecutive portions of said input signal directly into said input neurons;
   means for advancing said input signal so that the entire input signal from beginning to end is directed to each of said input neurons; and
   means for changing said weights to produce said predetermined output during a training procedure each time a portion of a training input is directed to said input neurons, whereby after a plurality of said training procedures, said neural network will respond with said predetermined output to an input signal that is similar to said training input.

2. The neural network of claim 1 wherein a plurality of said input neurons receive different portions of said input signal simultaneously.

3. The neural network of claim 1 wherein said means for directing further comprises a plurality of sampling circuits, each connected to one input neuron for directing a portion of said input signal into said input neuron.

4. The neural network of claim 1 wherein said means for advancing said input signal further comprises:
   means for transferring the output signal of each sampling circuit to the input of the next successive sampling circuit; and
   timing means for synchronizing the transferring of the output signal from each sampling circuit.

5. The neural network of claim 1 wherein said means for changing said weights further comprises:
   means for computing the difference between said desired output and the actual output during training; and
   means for minimizing the difference between said desired output and the actual output.

6. The neural network of claim 1 wherein said input signals comprise analog waveforms originating from a sensor.

7. The neural network of claim 1 wherein said desired output is a binary signal produced by a plurality of said neurons.

8. The neural network of claim 1 wherein said neurons further comprise:
   a layer of input neurons;
   at least one layer of inner neurons; and
   a layer of output neurons, wherein said synapses provide a weighted coupling between each neuron and each neuron in each adjacent layer.

9. The neural network of claim 1 wherein said neurons produce an output that depends upon the activation function which takes the form $$y_{(ij)} = \frac{1}{1 + e^{-(\Sigma_i w_{ji} x_{(ij)} + \theta_j)}}$$

where $y_{(ij)}$ is the output of each neuron in the previous layer, $w_{(ji)}$ is the weight associated with each synapse connecting the neurons in the previous layer to neuron j, and $\theta j$ is a fixed bias.

10. The neural network of claim 5 wherein said means for computing the difference between said desired output and the actual output generates an error signal which is propagated to each neuron, said error signal taking the form $$\delta_{ij} = (t_{ij} - y_{ij}) y_{(ij)} (1 - y_{ic})$$

and wherein said means for minimizing the difference between said desired output and the actual output adjusts weights by an amount
   $\Delta w$ that is calculated according to $$\Delta w = \eta \delta_{(ij)} + \alpha \Delta w_{(ijk)}.$$

11. A neural network for producing a desired output in response to a particular input signal comprising:
   a plurality of neurons adapted to receive signals and adapted to produce an output;

a plurality of connective synapses providing a weighted coupling between said neurons;

said neural network being capable of adapting itself during a training procedure to produce a predetermined output in response to a training input by changing the strength of said weighted connections;

selected ones of said neurons, designated input neurons, adapted to receive external input signals;

means for directing selected consecutive portions of said input signal directly into said input neurons;

means for advancing said input signal so that the entire input signal from beginning to end is directed to each of said input neurons; and means for changing said weights to produce said predetermined output during a training procedure while a training input advances through said input neurons, whereby after said training procedure said neural network will respond with said predetermined response to an input signal that is similar to said training input.

12. The neural network of claim 11 wherein a plurality of said input neurons receive different portions of said input signal simultaneously.

13. The neural network of claim 11 wherein said means for directing further comprises a plurality sampling circuits each connected to one input neuron for directing a portion of said input signal into said input neuron.

14. The neural network of claim 11 wherein said means for advancing said input signal further comprises:

means for transferring the output signal of each sampling circuit to the input of the next successive sampling circuit; and timing means for synchronizing the transferring of the output signal from each sampling circuit.

15. The neural network of claim 11 wherein said means for changing said weights further comprises:

means for computing the difference between said desired output and the actual output during training; and means for minimizing the difference between said desired output and the actual output.

16. The neural network of claim 11 wherein said input signals comprise analog waveforms originating from a sensor.

17. The neural network of claim 11 wherein said desired output is a binary signal produced by a plurality of said neurons.

18. The neural network of claim 11 wherein said neurons further comprise:

a layer of input neurons;

at least one layer of inner neurons; and a layer of output neurons, wherein said synapses provide a weighted coupling between each neuron and each neuron in each adjacent layer.

19. The neural network of claim 11 wherein said neurons produce an output that depends upon the activation function which takes the form $$y_{(j)} = \frac{1}{1 + e^{-(\Sigma_i w_{ji} y_{(i)} + \theta_j)}}$$

where $y_{(ij)}$ is the output of each neuron in the previous layer, $w_{(ji)}$ is the weight associated with each synapse connecting the neurons in the previous layer to neuron j, and $\theta j$ is a fixed bias.

20. The neural network of claim 15 wherein said means for computing the difference between said desired output and the actual output generates an error signal which is propagated to each neuron, said error signal taking the form $$\delta_{ij} = (t_{ij} - y_{ij}) y_{(ij)} (1 - y_{ic}),$$

and wherein said means for minimizing the difference between said desired output and the actual output adjusts weights by an amount $\Delta w$ that is calculated according to $$\Delta w = \eta \delta(ij) + \sigma \Delta w_{(ijk)}.$$

21. A multilayer perceptron for classifying an input waveform comprising:

a plurality of input neurons adapted to receive said input waveform and to produce an output that is a sigmoid function of said input waveform;

a plurality of inner neurons adapted to receive said output signals from said input neurons and adapted to produce an output signal that is a sigmoid function of said received signal;

a plurality for output neurons adapted to receive said output signal from said inner neurons that is a sigmoid function of said received signal;

a plurality of sampling circuits each connected to one input neuron for directing selected, consecutive portions of said input waveform into said input neurons;

means for transferring the output of each sampling circuit to the input of the next successive sampling circuit so that entire input waveform from beginning to end is directed to each of said input neurons in discrete steps;

timing means for synchronizing the transferring of the output signal from each sampling circuit;

means for training said perceptron to produce a predetermined output each time a portion of a training input is directed to said input neurons, including a means for computing the difference between said desired output and the actual output during retaining and means for minimizing the difference between said desired output and the actual output, whereby after a plurality of said training procedures, said perceptron will respond with said predetermined output to an input waveform that is similar to said training input.

22. A method for classifying an input signal having a characteristic waveform, said method comprising the steps of:

receiving said input signal by a network of processing units;

sampling simultaneously a plurality of consecutive portions of said input signal;

directing said sampled portions of said input signal to a plurality of said processing units;

advancing the sampled portions of the input signal through consecutive ones of said processing units until the entire input signal is sampled;

producing a plurality of intermediate signals by said processing units each of which is a function of said sampled portions of the input signal and an associated weighing function;

producing an output response that is dependent upon at least one of said intermediate signals;

training said network by comparing said output produced in response to a known input signal to a predetermined output, and modifying said weighing function to reduce the difference between the output produced and said desired output; and comparing the output produced in response to an unknown input widths aid predetermined output, wherein said unknown signal can be classified when said output produced matches said predetermined output.

23. The method of claim 22 wherein said step of advancing said input is accomplished in discrete steps and said weighting function is modified after each discrete step during the training step.

24. The method of claim 22 wherein the step of producing a plurality of intermediate signals and the step of producing an output response both further comprise the step of producing signals in accordance with the activation function $$y_{(ij)} = \frac{1}{1 + e^{-(\Sigma_i w_{ji} x_{(ij)} + \theta_j)}}$$

25. The method of claim 21 wherein said step of modifying said weighting function comprises changing the weighting functions by an amount $$\Delta w = \eta \delta(ik) + \alpha \Delta w_{(ijk)}$$

where $$\delta(ij) = (t_{ij} - y_{ij})y_{(ij)}(1 - y_{ic})$$

26. An information processor for classifying an input signal made in accordance with the method comprising:
receiving said input signal by a network of processing units;
sampling simultaneously a plurality of consecutive portions of said input signal;
directing said sampled portions of said input signal to a plurality of said processing units;
advancing the sampled portions of the input signal through consecutive ones of said processing units until the entire input signal is sampled;
producing a plurality of intermediate signals by said processing units each of which is a function of said sampled portions of the input signal and an associated weighing function;
producing an output response that is dependent upon at least one of said intermediate signals;
training said network by comparing said output produced in response to a known input signal to a predetermined output and modifying said weighing function to reduce the difference between the output produced and said predetermined output; and
comparing the output produced in response to an unknown input with said predetermined output, wherein said unknown signal can be classified when said output produced matches said predetermined output.

27. A method for classifying an input signal said method comprising the steps of:
receiving said input signal by a network of processing units;
sampling simultaneously a plurality of consecutive portions of said input signal;
directing said sampled portions of said input signal to a plurality of said processing units;
advancing the sampled portions of the input signal through consecutive ones of said processing units until the entire input signal is sampled;
producing a plurality of intermediate signals by said processing units each of which is a function of said sampled portions of the input signal and an associated weighing function;
producing an output response that is dependent upon at least one of said intermediate signals;
training said network by comparing said output produced in response to a known input signal to a predetermined output and modifying said weighing function to reduce the difference between the output produced and said predetermined output;
comparing the output produced in response to an unknown input with said predetermined output, wherein said unknown signal can be classified when said output produced matches said desired output; and
setting weights in a second network to be the same as those weights in a trained network, whereby an unlimited number of trained networks may be produced from a single trained network.

* * * * *